United States Patent
Polen et al.

(10) Patent No.: US 12,377,633 B2
(45) Date of Patent: Aug. 5, 2025

(54) DUAL-REINFORCED CONSTRUCTION BOARD

(71) Applicant: Owens Corning Intellectual Capital, LLC, Toledo, OH (US)

(72) Inventors: Shane Polen, Columbus, OH (US); Mitchell Steindler, Wooster, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 355 days.

(21) Appl. No.: 17/790,325

(22) PCT Filed: Jan. 8, 2021

(86) PCT No.: PCT/US2021/012797
§ 371 (c)(1),
(2) Date: Jun. 30, 2022

(87) PCT Pub. No.: WO2021/142337
PCT Pub. Date: Jul. 15, 2021

(65) Prior Publication Data
US 2023/0024168 A1 Jan. 26, 2023

Related U.S. Application Data

(60) Provisional application No. 62/983,941, filed on Mar. 2, 2020, provisional application No. 62/959,393, filed on Jan. 10, 2020.

(51) Int. Cl.
*B32B 5/24* (2006.01)
*B32B 3/08* (2006.01)
(Continued)

(52) U.S. Cl.
CPC ............. *B32B 5/245* (2013.01); *B32B 3/08* (2013.01); *B32B 5/022* (2013.01); *B32B 5/028* (2013.01);
(Continued)

(58) Field of Classification Search
CPC .. B32B 3/08; B32B 3/02; B32B 5/245; B32B 5/022; B32B 5/024; B32B 5/028;
(Continued)

(56) References Cited

U.S. PATENT DOCUMENTS

| | | |
|---|---|---|
| 3,874,980 A | 4/1975 | Richards et al. |
| 7,989,370 B2 | 8/2011 | Currier et al. |

(Continued)

FOREIGN PATENT DOCUMENTS

| | | |
|---|---|---|
| EP | 3453507 A2 | 3/2019 |
| WO | 2006115921 A1 | 11/2006 |
| WO | 2017120611 A1 | 7/2017 |

OTHER PUBLICATIONS

Office Action from Chinese Application No. 202180015283.5 dated May 6, 2023.

(Continued)

*Primary Examiner* — Camie S Thompson
(74) *Attorney, Agent, or Firm* — Calfee, Halter & Griswold LLP

(57) ABSTRACT

A dual-reinforced construction board is disclosed comprising a core having an upper surface and an opposing lower surface, a first reinforced fibrous facer adhered to the upper surface of the core and a second fibrous facer adhered to the lower surface of the core. Each of the first and second fibrous facer comprise a non-woven mat coated on a first surface with a coating composition. The first fibrous facer and optionally the second fibrous facer further include a reinforcement layer adhered to at least a portion of the first surface of the non-woven mat. The dual-reinforced construction board has a fastener pull-through strength of at least 400 lbf.

19 Claims, 11 Drawing Sheets

(51) Int. Cl.
  *B32B 5/02*   (2006.01)
  *B32B 5/18*   (2006.01)
  *B32B 5/26*   (2006.01)
  *B32B 7/12*   (2006.01)
  *B32B 17/06*  (2006.01)

(52) U.S. Cl.
  CPC ............... *B32B 5/18* (2013.01); *B32B 5/26* (2013.01); *B32B 7/12* (2013.01); *B32B 17/067* (2013.01); *B32B 2255/02* (2013.01); *B32B 2255/26* (2013.01); *B32B 2260/021* (2013.01); *B32B 2260/046* (2013.01); *B32B 2262/02* (2013.01); *B32B 2262/101* (2013.01); *B32B 2266/0214* (2013.01); *B32B 2307/304* (2013.01); *B32B 2307/54* (2013.01); *B32B 2307/718* (2013.01); *B32B 2307/72* (2013.01); *B32B 2307/732* (2013.01); *B32B 2419/06* (2013.01)

(58) Field of Classification Search
  CPC .... B32B 5/18; B32B 5/26; B32B 7/12; B32B 17/067; B32B 2255/02; B32B 2255/26; B32B 2255/20; B32B 2255/28; B32B 2260/021; B32B 2260/046; B32B 2260/044; B32B 13/00; B32B 2266/0214; B32B 2307/718; B32B 2307/304; B32B 2307/54; B32B 2307/72; B32B 2307/732; B32B 2607/00; D06N 3/042; D06N 2211/06; D06N 3/011; D06M 15/17; E04C 2/043; E04C 2/26; E04C 2/10; E04C 2/04; B28B 5/026; B28B 19/0092; B28B 2419/04; B29C 70/003; B05D 1/36; C09D 4/00; C09D 183/10; C09D 163/10
  USPC ......... 52/309, 536, 615, 731, 619, 570, 596, 52/599, 602, 609, 508, 409, 479
  See application file for complete search history.

(56) References Cited

U.S. PATENT DOCUMENTS

| | | |
|---|---|---|
| 8,426,017 B2 | 4/2013 | Paradis et al. |
| 10,000,922 B1 | 6/2018 | Letts |
| 2017/0268143 A1 | 9/2017 | Paradis et al. |
| 2018/0320370 A1 | 11/2018 | Letts et al. |
| 2019/0078243 A1 | 3/2019 | Bienmuller et al. |
| 2021/0108408 A1 | 4/2021 | Letts et al. |

OTHER PUBLICATIONS

Office Action from Canadian Application No. 3,167,421 dated Jun. 23, 2023.

International Search Report and Written Opinion from PCT/US2021/012797 dated Apr. 29, 2021.

Office Action from European Application No. 21703124.4 dated May 3, 2023.

Office Action from Canadian Application No. 3,167,421 dated Apr. 10, 2024.

Office Action from Chinese Application No. 202180015283.5 dated Jan. 19, 2024.

Office Action from Chinese Application No. 202180015283.5 dated Jun. 25, 2024.

8 Insulation Fasteners & Plates

12 Insulation Fasteners & Plates

DUAL-REINFORCED CONSTRUCTION BOARD

CROSS-REFERENCE TO RELATED APPLICATIONS

This application is the U.S. national stage entry of PCT/US2021/012797, filed on Jan. 8, 2021, which claims priority to and all benefit of U.S. Provisional Patent Application No. 62/959,393, filed on Jan. 2, 2020, and U.S. Provisional Patent Application No. 62/983,941, filed on Mar. 2, 2020, the entire disclosures of which are fully incorporated herein by reference.

BACKGROUND

Construction boards, such as gypsum or polymeric foam board panels, are used in building construction applications, such as roofing systems (insulation, coverboards, decking, and the like), sheathing, and wall boards for use in the partitions or walls of rooms, hallways, ceilings, and the like.

Roofing systems typically include one or more layers of a low-density roofing insulation, a layer of roofing coverboards that overlie the low-density roofing insulation layer(s), and a waterproofing membrane that overlies the layer of cover boards. The roofing insulation layer(s) often take the form of a polymeric foamed thermoset material such as polyurethane, polyisocyanurate, polyurethane modified polyisocyanurate (often referred to as polyiso) or phenolic resin, applied between two facing sheets. These insulation boards are generally manufactured on production lines where a liquid core chemical mixture is poured over a bottom facer, foaming up to contact a top facer in a constrained rise laminator. The reaction of the chemical mixture causing foaming is generally exothermic, as curing via polymerization and crosslinking occurs in the laminator. In the case of polyisocyanurate insulation boards, the curing exotherm can last well into the time the resulting rigid boards are cut, stacked and warehoused.

The installation of insulation in roofing systems tends to be a labor-intensive process, requiring the insulation boards to be manually fastened to a roof deck and coverboard to be manually fastened to insulation board. Currently, securing insulation boards requires the use of 8-32 metal fasteners per 4'×8' board and coverboards require 12-32 metal fasteners per 4'×8" board. Reducing the number of required fasteners would reduce install time and labor costs significantly.

SUMMARY

Any of the exemplary embodiments of the present inventive concepts may be directed to a dual-reinforced construction board comprising a core having an upper surface and an opposing lower surface and a first reinforced fibrous facer adhered to the upper surface of the core. The first reinforced fibrous facer comprises a non-woven mat coated on a first surface with a coating composition; and a reinforcement layer adhered to at least a portion of the first surface of the non-woven mat. The dual-reinforced construction board further comprises a second fibrous facer adhered to the lower surface of the core. The second fibrous facer comprises a non-woven mat coated on a first surface with a coating composition; and optionally a reinforcement layer adhered to at least a portion of the first surface of the non-woven mat.

In any of the exemplary embodiments, the dual-reinforced construction board may comprise an insulation board with a core having a thickness between about 1.0 and 5.0 inches. The dual-reinforced insulation board has a fastener pull-through strength of at least 400 lbf.

In any of the exemplary embodiments, the dual-reinforced construction board may comprise a coverboard with a core having a thickness between about 0.2 and 3.0 inches. The dual-reinforced insulation board has a fastener pull-through strength of at least 150 lbf.

In any of the exemplary embodiments, the non-woven mats of at least one of the first reinforced fibrous facer and second fibrous facer may comprise glass fibers.

In any of the exemplary embodiments, the coating composition of at least one of the first reinforced fibrous facer and second fibrous facer may comprise a polymeric binder component and a filler component. The polymeric binder component may be selected from the group consisting of a polymer or copolymer of acrylic acid, methacrylic acid, acrylates, methacrylates, acrylonitrile, styrene-butadiene-rubber (SBR), styrene-butadiene-styrene (SBS), ethylene-vinyl-chloride (EVCl), poly-vinylidene-chloride (PVdC), modified poly-vinyl-chloride (PVC), poly-vinyl-alcohol (PVOH), ethylene-vinyl-actate (EVA), and poly-vinyl-acetate (PVA), and combinations thereof. Additionally, the filler component may be selected from the group consisting of ground limestone (calcium carbonate), clay (kaolin), sand, mica, talc, gypsum (calcium sulfate dihydrate), aluminum trihydrate (ATH), vermiculite, antimony oxide, micronized rubber, or a combination thereof.

The reinforcement layer of at least one of the first fibrous non-woven facer and the second fibrous non-woven facer may comprise a scrim, a reinforcement tape, or a layer of insulation glass. In some exemplary embodiments, the scrim comprises glass fibers, synthetic fibers, or a combination thereof.

The reinforcement layer may comprise a reinforcement tape having a width between about 1 to about 4 inches.

In any of the exemplary embodiments, the dual-reinforced construction board may be an insulation board comprising a core of polymer foam having a density of less than 3.0 lbs./ft$^3$. Alternatively, the dual-reinforced construction board may comprise a coverboard with a polymer foam core having a density of greater than 3.0 lbs./ft$^3$.

Additional exemplary aspects of the present inventive concepts are directed to a dual-reinforced construction board comprising a core having an upper surface and an opposing lower surface; a first fibrous non-woven facer having a top surface and an opposing bottom surface, said bottom surface being adhered to said upper surface of said polymeric core; a second fibrous non-woven facer having a top surface and an opposing bottom surface, the bottom surface being adhered to the top surface of the first fibrous non-woven facer; and a coating composition applied to at least one of the top surface of the first fibrous facer and the top surface of the second fibrous facer.

In any of the exemplary embodiments, the dual-reinforced construction board comprises an insulation board with a core having a thickness between about 1.0 and 5.0 inches. The dual-reinforced insulation board has a fastener pull-through strength of at least 400 lbf.

In any of the exemplary embodiments, the dual-reinforced construction board comprises coverboard with a core having a thickness between about 0.2 and 3.0 inches. The dual-reinforced insulation board has a fastener pull-through strength of at least 150 lbf.

Yet further exemplary aspects of the present inventive concepts are directed to a dual-reinforced construction board comprising a core having an upper surface and an opposing lower surface and a first reinforced fibrous facer adhered to the upper surface. The first reinforced fibrous facer comprise a non-woven mat having a first major surface and an opposing second major surface; a reinforcement layer adhered to at least a portion of the first major surface of the non-woven mat; and a coating composition disposed on a surface of the reinforcement layer. The dual-reinforced construction board further comprises a second reinforced fibrous facer adhered to the lower surface that includes a second non-woven mat having a first major surface and a second major surface; a reinforcement layer adhered to at least a portion of the first major surface of the non-woven mat; and a coating composition disposed on a surface of the reinforcement layer.

In any of the exemplary embodiments, the dual-reinforced construction board may comprise an insulation board with a core having a thickness between about 1.0 and 5.0 inches. The dual-reinforced insulation board has a fastener pull-through strength of at least 400 lbf.

In any of the exemplary embodiments, the dual-reinforced construction board may comprise a coverboard with a core having a thickness between about 0.2 and 3.0 inches. The dual-reinforced insulation board has a fastener pull-through strength of at least 150 lbf.

Yet further exemplary embodiments are directed to a dual-reinforced construction board having a core having an upper surface and an opposing lower surface, a fibrous facer adhered to the upper surface of the core, comprising a coated non-woven mat comprising a plurality of nonwoven glass fibers bound by a thermoset binder composition. The non-woven mat is impregnated with a first coating composition and further includes a second coating composition applied on a first surface of the non-woven mat.

In any of the exemplary embodiments, the dual-reinforced construction board may comprise an insulation board with a core having a thickness between about 1.0 and 5.0 inches. The dual-reinforced insulation board has a fastener pull-through strength of at least 400 lbf.

In any of the exemplary embodiments, the dual-reinforced construction board may comprise a coverboard with a core having a thickness between about 0.2 and 3.0 inches. The dual-reinforced insulation board has a fastener pull-through strength of at least 150 lbf.

BRIEF DESCRIPTION OF THE FIGURES

The subject matter of the present disclosure is particularly pointed out and distinctly claimed in the concluding portion of the specification. A more complete understanding of the disclosure, however, may best be obtained by referring to the detailed description and claims when considered in connection with the figures, wherein like numerals denote like elements.

DETAILED DESCRIPTION

Figure 2:
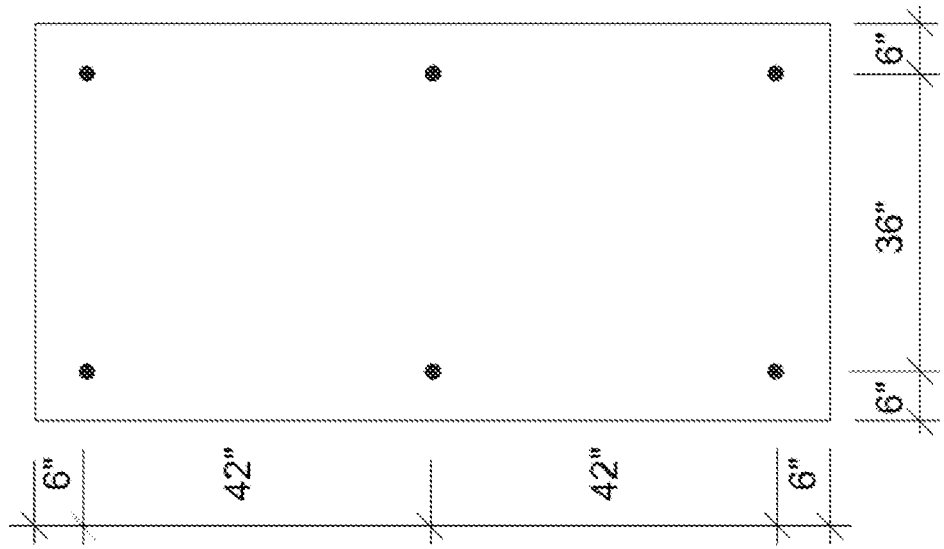
FIG. 2 illustrates a novel fastener pattern on a coverboard panel, comprising six fasteners.

Unless otherwise defined, all technical and scientific terms used herein have the same meaning as commonly understood by one of ordinary skill in the art to which this application pertains. Although other methods and materials similar or equivalent to those described herein may be used in the practice or testing of the exemplary embodiments, exemplary suitable methods and materials are described below. In case of conflict, the present specification including definitions will control. In addition, the materials, methods, and examples are illustrative only and not intended to be limiting of the general inventive concepts.

The terminology as set forth herein is for description of the exemplary embodiments only and should not be construed as limiting the application as a whole. Unless otherwise specified, "a," "an," "the," and "at least one" are used interchangeably. Furthermore, as used in the description of the application and the appended claims, the singular forms "a," "an," and "the" are inclusive of their plural forms, unless contradicted by the context surrounding such.

Unless otherwise indicated, all numbers expressing quantities used in the specification and claims are to be understood as being modified in all instances by the term "about." The term "about" means within +/−10% of a value, or in some instances, within +/−5% of a value, and in some instances within +/−1% of a value.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

All combinations of method or process steps as used herein can be performed in any order, unless otherwise specified or clearly implied to the contrary by the context in which the referenced combination is made. Additionally, all combinations of compositions and compositional ranges may be used in any combination of compositions listed herein.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." Thus, use of the term "or" herein is the inclusive, and not the exclusive use.

The terms "binder," "binder composition," and "curable composition," as used herein, are used interchangeably and refer to a material that holds one or more components of a non-woven article together. Those of ordinary skill in the art will understand that a binder composition is often an aqueous mixture or solution of dissolved ingredients that cures to interconnect fibers together.

The terms "binder solids" or "binder components," as used herein, are used interchangeably and refer to the functional ingredients of the binder composition prior to addition or mixing with water to form the ultimate binder for application to the inorganic fibers.

The terms "non-woven," "mat," "veil," and "facer" are used interchangeably herein and refer to a bound web of fibers.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts relate to dual-reinforced construction boards comprising a novel configuration of non-woven facers found to achieve improved fastener pull-through strength. By "dual-reinforced" it is meant that the construction board is reinforced by two or more methods, such as by utilizing two coated facers (i.e., one coated facer adhered to each major surface of the board), utilizing a reinforced coated facer (i.e., such as with the inclusion of a scrim), and/or utilizing a facer that is both impregnated with a first coating composition and then coated on a single side with a second coating composition.

Traditionally, facer materials have included, among others, non-woven fiber (e.g., fiberglass) mats. Non-woven fiber mats generally comprise randomly matted fibers bonded together by a cured thermoset or dried thermoplastic polymeric binder. The processes for forming such mats are generally well known, including for example, the well-known wet-laid processing and dry-laid processing methods. In an exemplary process for forming non-woven glass fiber mats, chopped glass fibers may be provided to a conveying apparatus such as a conveyor by a storage container for conveyance to a mixing tank that may contain the white water (e.g., various surfactants, viscosity modifiers, defoaming agents, and/or other chemical agents) with agitation to disperse the fibers and form a chopped glass fiber slurry. The glass fiber slurry may be transferred to a head box where the slurry is deposited onto a conveying apparatus such as a moving screen or foraminous conveyor, and a substantial portion of the water from the slurry is removed to form a web (mat) of enmeshed fibers. The water may be removed from the web by a conventional vacuum or air suction system.

A binder is then applied to the web by a suitable binder applicator, such as by curtain coating, spraying, twin wire dip bath, two roll padder, and the like. Once the binder has been applied to the mat, the binder coated mat is passed through at least one drying oven to remove any remaining water and cure the binder composition. The formed non-woven fiber mat that emerges from the oven is an assembly of randomly oriented, dispersed, individual glass fibers. The fiber mat may be rolled onto a take-up roll for storage or later use.

A dry-laid process is a process in which fibers are chopped and air blown onto a conveyor, after which a binder is then applied and cured to form the mat.

The non-woven fiber mat of the present disclosure may be formed from a variety of materials. In general, the non-woven fiber mat comprises a plurality of fibers and a binder composition that binds the fibers together. Exemplary fibers for forming the non-woven fiber mat include, but are not limited to, glass fibers, synthetic fibers (e.g., polyester fibers, polyethylene fibers, polypropylene fibers, polyethylene terephthalate fibers, polyamide fibers, aramid fibers, polyaramid fibers), mineral fibers, carbon fibers, ceramic fibers, natural fibers (e.g., cellulose fibers, cotton fibers, jute fibers, bamboo fibers, ramie fibers, bagasse fibers, hemp fibers, coir fibers, linen fibers, kenaf fibers, sisal fibers, flax fibers, henequen fibers), or a blend of two or more different types of fibers.

In certain embodiments, the non-woven fiber mats comprise glass fibers. The glass fibers can be made from any type of glass. Exemplary glass fibers include, but afre not limited to, A-type glass fibers, C-type glass fibers, E-type glass fibers, S-type glass fibers, ECR-type glass fibers (e.g., Advantex® glass fibers commercially available from Owens Corning of Toledo, Ohio), Hiper-tex® glass fibers, wool glass fibers, high performance glass fibers, and combinations thereof.

The glass fibers used to form the non-woven fiber mats may have a variety of fiber diameters. In certain embodiments, the glass fibers used to form the non-woven facers have an average fiber diameter of 5.5 microns to 25 microns. In certain embodiments, the glass fibers used to form the non-woven fiber mats have an average fiber diameter of 3 microns to 23 microns, including average fiber diameters of 6 microns to 16 microns, or 11 microns to 13 microns. It is also contemplated that a blend of glass fibers having different fiber diameters, such as a blend of smaller diameter glass fibers (e.g., average fiber diameter of 5.5 microns to 10 microns) and larger diameter glass fibers (e.g., average fiber diameter of 13 microns to 16 microns), may be used to form the non-woven fiber mats.

The glass fibers used to form the non-woven fiber mats may also have a variety of fiber lengths. In certain embodiments, the glass fibers used to form the non-woven fiber mats have an average fiber length of 6.35 mm to 50.8 mm. In certain embodiments, the glass fibers have an average fiber length of 12.7 mm to 38.1 mm. In certain other embodiments, the glass fibers have an average fiber length of 19.05 mm to 25.4 mm. In various exemplary embodiments, the glass fibers have an average length of 25.4 mm to 35 mm. It is also contemplated that a blend of glass fibers having different fiber lengths, such as a blend of shorter glass fibers (e.g., average fiber length of 6.35 mm to 12.7 mm) and longer glass fibers (e.g., average fiber length of 19.05 mm to 31.75 mm), may be used.

As mentioned above, the non-woven fiber mats also include a binder composition to bind the fibers together. Any conventional binder composition used to form non-woven fiber mats may be used to form the non-woven facers of the present disclosure. In certain embodiments, the binder composition comprises a binder resin material, a coupling agent, and one or more optional additives. The binder resin may be a thermoset material, a thermoplastic material, or a mixture of a thermoset material and a thermoplastic material. In some exemplary embodiments, the binder resin material comprises any of a latex material, an elastomeric material, acrylic material, styrene-acrylic material, styrene butadiene, a urea formaldehyde material, a melamine formaldehyde material, epoxy, polyurethane, polyvinyl alcohol, or a combination of the two materials. In some exemplary embodiments, the acrylic material is polyacrylic acid, such as low molecular weight polyacrylic acid with a weight average molecular weight at or below 10,000 Daltons.

In some exemplary embodiments, the binder resin material comprises a blend of urea formaldehyde and a thermoset or thermoplastic acrylic. In some embodiments, the thermoset acrylic comprises an acrylic homopolymer or copolymer. The urea formaldehyde may be present in the binder resin material in an amount from about 70 wt. % to about 95 wt. %, based on the total weight of the binder resin material, including between about 78 wt. % and 92 wt. %, and between about 80 wt. % and about 90 wt. %. The thermoset acrylic may be present in the binder composition in an amount from about 5 wt. % to about 30 wt. %, based on the total weight of the binder resin material, including between about 7 wt. % and 25 wt. %, and about 10 to about 20 wt. %.

The binder composition may further include a coupling agent. It is to be appreciated that the coupling agents described herein are exemplary in nature, and any suitable coupling agent known to those of ordinary skill in the art may be utilized in any of the exemplary embodiments described or otherwise suggested herein. In certain embodiments, the coupling agent, or coupling agents, may be present in the binder composition in an amount of 0.05% to 10% based on the total weight of the binder composition. In certain embodiments, the coupling agent, or coupling agents, may be present in the binder composition in an amount of 0.1% to 3% based on the total weight of the binder composition. In certain embodiments, the coupling agent, or coupling agents, may be present in the binder composition in an amount of 0.15% to 0.5% based on the total weight of the binder composition.

In certain embodiments, at least one of the coupling agents is a silane coupling agent. Suitable silane coupling agents may include silanes containing one or more nitrogen atoms that have one or more functional groups such as amine (primary, secondary, tertiary, and quaternary), amino, imino, amido, imido, ureido, or isocyanato. Suitable silane coupling agents may also include, but are not limited to, aminosilanes, silane esters, vinyl silanes, methacryloxy silanes, epoxy silanes, sulfur silanes, ureido silanes, and isocyanato silanes. Specific, non-limiting examples of silane coupling agents for use in the instant invention include γ-methacryloxypropyl-trimethoxysilane (A-174), γ-aminopropyltriethoxysilane (A-1100), n-phenyl-γ-aminopropyltrimethoxysilane (Y-9669), n-trimethoxy-silyl-propyl-ethylene-diamine (A-1120), methyl-trichlorosilane (A-154), γ-chloropropyl-trimethoxy-silane (A-143), vinyl-triacetoxysilane (A-188), and methyltrimethoxysilane (A-1630).

The binder composition used to form the non-woven fiber mats of the present disclosure may optionally include additional components such as, for example, cellulose additives, dyes, oils, fillers, micronized rubber filler, colorants, aqueous dispersions, UV stabilizers, lubricants, wetting agents, surfactants, viscosity modifiers, and/or antistatic agents. Such additives may be included in the binder composition in an amount of 0% percent to 10% based on the total weight of the binder composition.

In certain embodiments, the binder composition used to form the non-woven fiber mats of the present disclosure may include water to dissolve or disperse the functional components for application onto the fibers. Water may be added in an amount sufficient to dilute the aqueous binder composition to a viscosity that is suitable for its application to the fibers.

The non-woven fiber mats of the present disclosure may have a wide range of basis weights (uncoated). In certain embodiments, the non-woven fiber mats have an uncoated basis weight of 25 g/m2 to 300 g/m2. In certain other embodiments, the non-woven fiber mats have an uncoated basis weight of 30 g/m2 to 200 g/m2. In still other embodiments, the non-woven fiber mats have an uncoated basis weight of 40 g/m2 to 150 g/m2, including an uncoated basis weight of 50 g/m2 to 100 g/m2, an uncoated basis weight of 55 g/m2 to 80 g/m2, and also including an uncoated basis weight of 65 g/m2 to 75 g/m2. In still other embodiments, the non-woven fiber mats have an uncoated basis weight of at least 63 g/m2. In some exemplary embodiments, the non-woven fiber mats of the present disclosure have an uncoated basis weight of 200 $g/m^2$ to 300 $g/m^2$, including an uncoated basis weight of 225 $g/m^2$ to 275 $g/m^2$, and an uncoated basis weight of 240 $g/m^2$ to 260 $g/m^2$.

The non-woven fiber mats of the present disclosure may also have a variety of thicknesses. In certain embodiments, the non-woven fiber mats have a thickness of 0.25 mm to 2 mm. In certain other embodiments, the non-woven fiber mats have a thickness of 0.3 mm to 0.7 mm. In still other embodiments, the non-woven fiber mats have a thickness of 0.3 mm to 0.6 mm. In certain embodiments, the non-woven fiber mats have a thickness of 0.75 mm to 2 mm, including a thickness of 1 mm to 2 mm, a thickness of 1.25 mm to 1.9 mm, and also including a thickness of 1.5 mm to 1.8 mm.

In any of the embodiments herein, the non-woven fiber mats may be coated or impregnated with a coating composition, forming a non-woven facer. In certain exemplary embodiments, the coating composition fully impregnates the non-woven fiber mat, such that the coating composition fully penetrates or at least substantially fully penetrates the thickness of the mat. By "substantially fully penetrates" it is meant that the coating composition penetrates at least 75% of the thickness of the non-woven mat.

In other exemplary embodiments, the coating composition is applied to a first surface of the non-woven fiber mat and extends partially into the thickness of the mat (i.e., partially through a thickness of the mat measured from a first surface to an opposing second surface), forming a coating layer. In certain embodiments, the coating layer extends into the non-woven mat in an amount of up to 75% of the thickness of mat. In certain embodiments, the coating layer may extend into the non-woven fiber mat in an amount of up to 50% of the thickness of the mat. In certain embodiments, the coating layer may extend into the non-woven fiber mat in an amount of 10% to 50% of the thickness of non-woven fiber mat, and also including from 5% to 25% of the thickness of the non-woven fiber mat. In certain embodiments, the second surface of the non-woven fiber mat is free of a coating composition. It should be appreciated that the thickness to which the coating layer extends into the non-woven fiber mat may vary somewhat along the width and/or length of the non-woven fiber, or it may be uniform.

In some exemplary embodiments, the non-woven fiber mats are coated or impregnated with a first coating composition and then coated with a second coating composition. The first and second coating compositions may be the same or different compositions, described in more detail below. The process of coating or impregnating the non-woven fiber mats, followed by a secondary coating of the mats may occur in-line, in one continuous process, or the first coating or impregnation and secondary coating processes may occur in distinct processing steps. Regardless of process sequence, the initial coated or impregnated non-woven fiber mat is at least substantially fully cured and dried, prior to application of the second coating composition. In some exemplary embodiments, the first coated or impregnated non-woven fiber mat is fully cured and dried, prior to application of the second coating composition.

The coating composition(s) may comprise a polymeric binder component and optionally a filler component, which may also be referred to as a mineral pigment. Suitable polymeric binders may include latex binders. Exemplary polymeric binders include one or more polymers selected from styrene-butadiene-rubber (SBR), styrene-butadiene-styrene (SBS), ethylene-vinyl chloride (EVCl), poly-vinylidene chloride (PVdC), modified poly-vinyl chloride (PVC), poly-vinyl alcohol (PVOH), ethylene-vinyl acetate (EVA), vinyl acetate ethylene (VAE), and poly-vinyl-acetate (PVA). In one or more embodiments, the polymeric binder is a polymer or copolymer of acrylic acid, methacrylic acid, acrylates, methacrylates, acrylonitrile, and combinations thereof. In one or more embodiments, the amount of polymeric binder in the coating composition may be described as a percent weight of coating binder based on the weight of the total solids (the non-water portion of the coating composition) in the coating composition. In one or more embodiments, the coating composition may include about 2% to about 20% polymeric binder, in other embodiments, about 4% to about 15% polymeric binder, about 5% to about 10% polymeric binder, and in other embodiments about 5.5% to about 7.5% polymeric binder based on the weight of the total solids in the coating composition.

In some exemplary embodiments, the coating composition comprises 80% to 100% polymeric binder, based on the weight of the total solids in the coating composition. In such embodiments, the coating composition may be free or at least substantially free of filler.

Exemplary fillers suitable for use in the coating composition(s) but are not limited to, ground limestone (calcium carbonate), clay (kaolin), sand, mica, talc, gypsum (calcium sulfate dihydrate), aluminum trihydrate (ATH), vermiculite, antimony oxide, micronized rubber, or a combination of any two or more of these substances. In one or more embodiments, the amount of filler in the coating composition may be described as a percent weight of filler based on the weight of the total solids (the non-water portion of the coating composition) in the coating composition. In one or more embodiments, the coating composition may include about 65% to about 99% filler, in other embodiments, about 75% to about 98% filler, and in other embodiments about 80% to about 97% filler based on the weight of the total solids in the coating composition. As mentioned above, various exemplary embodiments the coating composition is free of filler.

The coating composition may be an aqueous coating composition. In these or other embodiments, the amount of water in the coating composition may be described as a percent weight of water based on the total weight of the coating composition. In one or more embodiments, the coating composition may include about 15% to about 60% water, in other embodiments about 20% to about 50% water, and in other embodiments about 30% to about 40% water based on the total weight of the coating composition.

The coating composition of the present disclosure may optionally include one or more additives. Such additives may be included in the coating composition in an amount up to about 10.0 wt. %, including between about 0.5 wt. % and 8 wt. %, and about 1.0 wt. % to about 5.0 wt. %, based on the total weight of the coating composition. Exemplary additives include, but are not limited to, fire retardants, dyes, pigments, UV stabilizers, anti-static agents, film forming agents, viscosity or rheology modifiers, hydrophobic agents, and so forth. Exemplary hydrophobic agents may include fluorochemicals, silicones, waxes, hydrocarbons, or combinations thereof.

Exemplary fire retardants may include, mineral based (ATH, magnesium hydroxide), halogen based, (TCPP), phosphorus based (APP), and intumescent (expandable graphite) fire retardants. In various embodiments, the mineral based (ATH, magnesium hydroxide) and intumescent (expandable graphite) fire retardants in the coating composition represent 0 to 40% by weight of the coating composition. In various embodiments, the mineral based (ATH, magnesium hydroxide) and intumescent (expandable graphite) fire retardants in the coating composition represent 5% to 30% by weight of the coating composition, including 15% to 25% by weight of the coating composition.

If present, the impregnation coating composition (or first coating composition) may be applied to the non-woven fiber mat in an amount from 10 $g/m^2$ to 50 $g/m^2$, including an amount from 15 $g/m^2$ to 45 $g/m^2$, and from 25 $g/m^2$ to 40 $g/m^2$. In certain exemplary embodiments, the impregnation coating composition may be applied to the non-woven fiber mat in an amount from 20 $g/m^2$ to 50 $g/m^2$.

The coating composition (or second coating composition if a first coating or impregnation coating is present) of the present disclosure may be applied to the non-woven fiber mat in a wide range of coat weights. In certain embodiments, the coating composition has a coat weight of 10 $g/m^2$ to 300 $g/m^2$. In certain other embodiments, the coating composition has a coat weight of 25 $g/m^2$ to 250 $g/m^2$. In still other embodiments, the coating composition has a coat weight of 50 $g/m^2$ to 225 $g/m^2$, including a coat weight of 60 $g/m^2$ to 215 $g/m^2$, and also including a coat weight of 75 $g/m^2$ to 200 $g/m^2$. The coating composition may be applied and dried or cured in any suitable manner to the non-woven fiber mat to achieve the desired coating profile. For example, the facer coating composition can be applied via knife coating, curtain coating, spray coating, roll coating, and the like prior to drying and/or curing the mat.

The coated non-woven facer has a loss on ignition (LOI) in the range of 5 to 45%, which may vary based on whether the coated non-woven facer is just impregnated, both impregnated and coated, coated with a first and second coating, or just a single coated. If the non-woven facer is both impregnated and coated, the LOI of the facer may be between 12 and 25%, including between 15 and 22%, and 17 and 20%. If the non-woven facer is only coated, the LOI of the facer may be between 5 and 25%, including between 9 and 20%, and 10 and 15%. In embodiments in which the non-woven facer is impregnated, but not coated, the non-woven facer may have an LOI from 20% to 45%.

The non-woven facer of the present disclosure may have a coated basis weight (or impregnated and coated) of 200 g/m² to 525 g/m². In certain embodiments, the non-woven facers have a coated basis weight of 250 g/m² to 500 g/m². In certain other embodiments, the non-woven facers have a coated basis weight of 300 g/m² to 480 g/m². In still other embodiments, the non-woven facers have a coated basis weight of 350 g/m² to 460 g/m², including a coated basis weight of 375 g/m² to 450 g/m².

In some exemplary embodiments, the non-woven facer includes a reinforcement layer adhered to at least a portion of a surface of the non-woven facer, forming a reinforced facer. For example, in some exemplary embodiments, the reinforcement layer may comprise one or more additional non-woven facer. In other exemplary embodiments, the reinforcement layer may comprise a scrim adhered to at least one surface of the non-woven facer. The scrim may include woven or non-woven constructions, comprising fibers, such as glass or synthetic fibers. Exemplary fibers for forming the reinforcing scrim include, but are not limited to, glass fibers, synthetic fibers (e.g., polyester fibers, polyethylene fibers, polypropylene fibers, polyethylene terephthalate fibers, polyamide fibers, aramid fibers, polyaramid fibers), mineral fibers, carbon fibers, ceramic fibers, natural fibers (e.g., cellulose fibers, cotton fibers, jute fibers, bamboo fibers, ramie fibers, bagasse fibers, hemp fibers, coir fibers, linen fibers, kenaf fibers, sisal fibers, flax fibers, henequen fibers), or a blend of two or more different types of fibers. In some exemplary embodiments, the scrim is a fiberglass scrim with a woven construction, having woven strands disposed at right angles to each other.

The scrim may be formed by applying a coating composition to the fibers either before the fibers are woven or otherwise formed into the scrim, or after. The coating stabilizes the weave of the scrim, prevents deformation, and prevents fiber fraying during processing. Additionally, the coating may also be beneficial in bonding the scrim to the core. In some exemplary embodiments, the coating composition comprise a polymeric binder including, for example, one or more polymers selected from styrene-butadiene-rubber (SBR), styrene-butadiene-styrene (SBS), ethylene-vinyl-chloride (EVCl), poly-vinylidene-chloride (PVdC), modified poly-vinyl-chloride (PVC), poly-vinyl-alcohol (PVOH), ethylene-vinyl-acetate (EVA), and poly-vinyl-acetate (PVA). In one or more embodiments, the polymeric binder is a polymer or copolymer of acrylic acid, methacrylic acid, acrylates, methacrylates, acrylonitrile, and combinations thereof.

In some exemplary embodiments, the reinforcement layer comprises a reinforcement strip or tape, that adheres to a portion of a surface of the non-woven facer. The reinforcement strip or tape may comprise a scrim, as mentioned above, or may be formed form any material for reinforcing and strengthening a portion of a non-woven facer, including a second nonwoven facer, paper, film, polymer-based.

Figure 5:
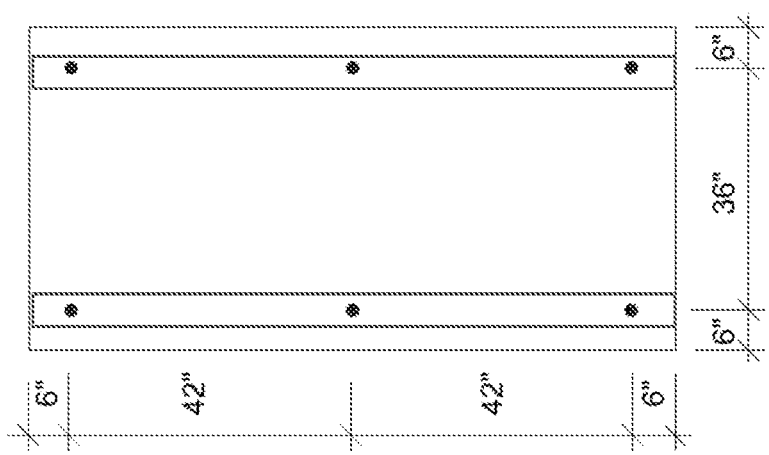
FIG. 5 illustrates an exemplary 2-inch reinforcement tape pattern on a surface of a non-woven facer.
Figure 8:
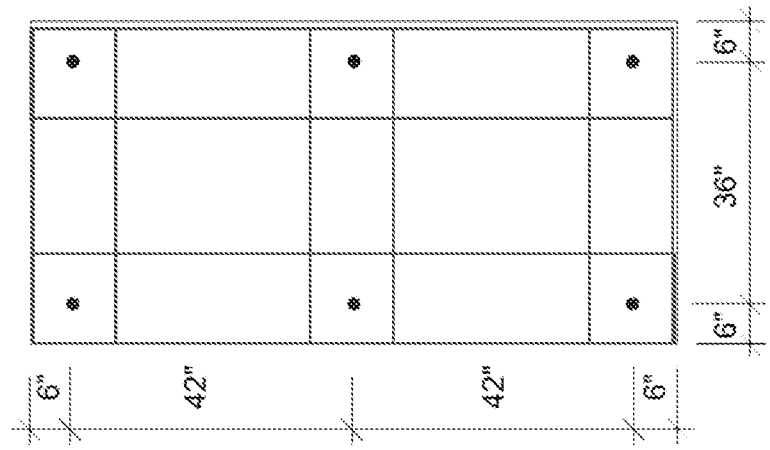
FIG. 8 illustrates an exemplary 6-inch reinforcement tape pattern on a surface of a non-woven facer, including additional cross-directional reinforcements.
Figure 7:
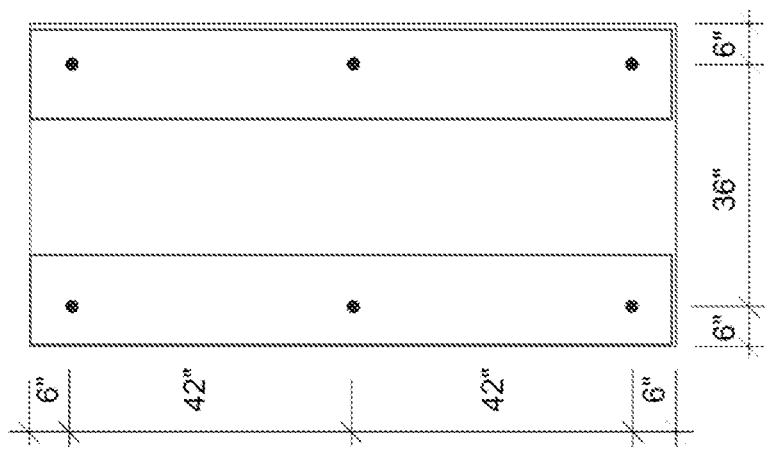
FIG. 7 illustrates an exemplary 6-inch reinforcement tape pattern on a surface of a non-woven facer.

The reinforcement tape may extend across at least a portion of the length of the non-woven facer (in the machine direction) and have a width that is less than the width of the non-woven facer, as illustrated in FIGS. 5 (2-inch strips), 6 (4-inch strips), and 7 (6-inch strips). A single reinforcement tape may be adhered to a surface of the non-woven facer, or the non-woven facer may include a plurality of reinforcement tapes. In some exemplary embodiments, the reinforcement tape extends across at least a portion of the width of the non-woven facer (in the cross direction) and has a width that is less than the length of the non-woven facer. In yet other exemplary embodiments, the reinforcement tapes extend in a "grid" pattern which includes one or more tapes extending along a surface of the non-woven facer in both the machine and cross directions, as illustrated in FIG. 8. In some exemplary embodiments, the reinforcement tape has a width between about 1 and 8 inches, including between about 2 and 6 inches, and about 3 and 5 inches. Reinforcement tapes applied to a single non-woven facer surface may have the same widths or may comprise a variety of different widths.

In some exemplary embodiments, the reinforcement layer comprises a layer of insulation glass, which comprises a thin layer of glass fibers having an average diameter of less than about 10 microns. The layer of insulation glass may comprise a plurality of fine glass fibers bound together with a binder composition that may be cured or uncured. If uncured, the insulation glass layer may be more easily deformed and then cured along with the core material. In some exemplary embodiments, the layer of insulation glass may be adhered to the core-facing surface of the non-woven facer. When a core material, such as a polymeric foam core material, is deposited onto the layer of insulation glass, the core material may soak into the insulation glass before expanding, which will cause the core to be reinforced with insulation glass. By incorporating a reinforcement layer into the core, the compression strength and overall strength of the board is improved. In some exemplary embodiments, the layer of insulation glass is adhered to the bottom surface of the non-woven facer that is laid onto a core material (top facer), the core material may expand and bleed through the insulation glass layer before adhering to the top facer, which may result in reinforcement of the top layer of core material. In other exemplary embodiments, each of the top and bottom facers include a layer of insulation glass adhered thereto.

If present, the reinforcement layer may be adhered to the non-woven facer by any means known and conventionally used in the art, such as via an adhesive, lamination, etc. In some exemplary embodiments, the reinforcement layer is embedded into the coating layer on the surface of the non-woven facer, adhering the reinforcement layer to the surface of the facer. Alternatively, in some exemplary embodiments, the reinforcement layer is placed on a surface of an uncoated non-woven facer and a coating composition is subsequently applied over the scrim/non-woven facer combination. Once the coating is applied, the product is dried and the coating sufficiently adheres the scrim to the non-woven facer.

The reinforced non-woven facers demonstrate an enhanced tensile strength of at least 250 lb/2-in., including at least 255 lb/2-in., and 260 lb/2-in., measured in accordance with ASTM test methods D76 and D146. This is in contrast to conventional non-woven facer tensile strengths of about 110 lb/2-in.

The reinforced nonwoven facers are used in the manufacture of construction boards, such as insulation boards, coverboards (polymeric foam or gypsum-based), gypsum boards, and the like. Insulation and coverboards are typically used in roofing systems, such as low-slope roof decks. The roofing systems for these low-slope roof decks typically include one or more layers of a low-density insulation, a layer of coverboards that overlie the low-density insulation layer(s), and a waterproofing membrane that overlies the layer of coverboards. Such boards often comprise a polymeric foamed thermoset core material, such as polyurethane, polyisocyanurate (often referred to as polyiso), or phenolic resin, with a top surface and an opposing bottom surface. The boards may alternatively comprise a gypsum material.

In some exemplary embodiments, lower density insulation boards comprise a foam core having an average density of less than 3.0 lbs./ft$^3$. In some exemplary embodiments, the foam core has an average density of about 1 lbs./ft$^3$ to about 2.8 lbs./ft$^3$, and in other embodiments about 1.5 lbs./ft$^3$ to about 2.0 lbs./ft$^3$. In some exemplary embodiments, the lower density insulation board comprises a foam core with a density below 2.0 lbs./ft$^3$.

In some exemplary embodiments, the dual-reinforced low density insulation boards having foam cores with a thickness of between 1.0 to 5.0 inches demonstrate an enhanced fastener pull-through strength of at least 400 lbf., including at least 410 lbf., and at least 425 lbf, measured in accordance with modified ASTM D1761.

With regard to higher density coverboard, such boards comprise a core having an average density of at least 3.0 lbs./ft$^3$. In these or other embodiments, the core has an average density of about 3.0 lbs./ft$^3$ to about 25 lbs./ft$^3$, and in other embodiments about 4.0 lbs./ft$^3$ to about 8 lbs./ft$^3$. In some exemplary embodiments, the coverboard core has a density of about 3.2 lbs./ft$^3$ to 6 lbs./ft$^3$, or from 3.5 lbs./ft$^3$ to less than 6 lbs./ft$^3$. As mentioned above, the coverboard core may comprise a polymeric foam or a gypsum material.

In some exemplary embodiments, the dual-reinforced higher density coverboards having cores with a thickness of between 0.2 to 3.0 inches demonstrate an enhanced fastener pull-through strength of at least 150 lbf., including at least 170 lbf., and at least 200 lbf, measured in accordance with modified ASTM D1761.

In some exemplary embodiments, the construction board comprises a gypsum board. The gypsum board includes a gypsum core with two opposing surfaces and at least one non-woven facer situated on at least one of the opposing sides. Gypsum boards formed of a gypsum core sandwiched between facing layers are commonly used in the construction industry as internal walls and ceilings for both residential and commercial buildings. Formulations and the design of the gypsum board may be tailored for the specific use desired for the board. In one or more embodiments, the gypsum core includes gypsum, optionally wet chopped glass fibers, water resistant chemicals, binders, accelerants, and low-density fillers.

In some exemplary embodiments, the construction boards comprise a non-woven facer adhered to the first or second major surface of the core, or to both the first and second surfaces. The non-woven facers adhered to the first and/or second major surfaces of the core may be the same or different. Although, such construction boards are herein described in the form of "sandwich" panels or boards wherein the core is covered with a facer on both sides, it may also include a board having a facer of this type only on one side. The other side may have another type of facer or none at all, depending on the manner in which it is to be used.

In some exemplary embodiments, at least one of the non-woven facers adhered to the core comprises a reinforced non-woven facer. Conventionally, non-woven facers are used on only a single side of the bottom (deck side) of coverboards. However, it has been found that by adhering the subject reinforced non-woven facers to one or more of the top and bottom surfaces of the polymer core in coverboard is capable of reducing the number of metal fasteners required to fasten the board to a roof deck.

Figure 1:
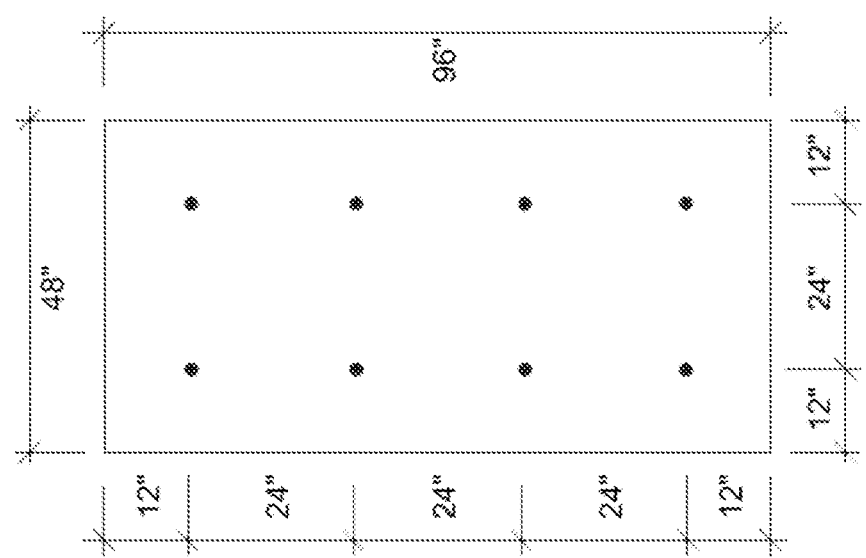
FIG. 1 illustrates a prior art fastener pattern on a coverboard panel, comprising eight fasteners.

As mentioned above and illustrated in FIG. 1, conventionally, installing coverboards in roofing applications requires at least 8 fasteners per 4'×8' board to fasten the coverboard to a roof deck, and typically upwards of 16 fasteners. However, it was discovered that by including reinforced non-woven facers on each of the top and bottom surfaces of the foam core, the number of required fasteners is reduced to 6 or less. See FIG. 2.

Figure 4:
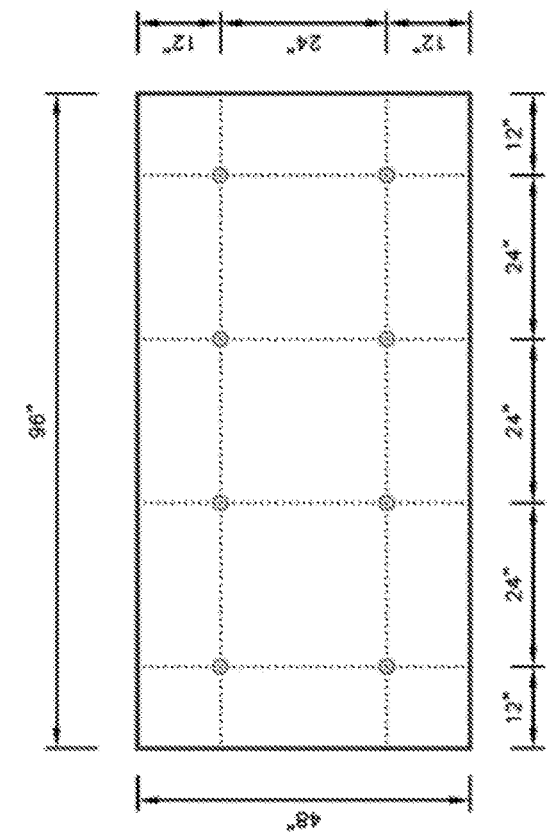
FIG. 4 illustrates a novel fastener pattern on an insulation board, comprising eight fasteners.
Figure 3:
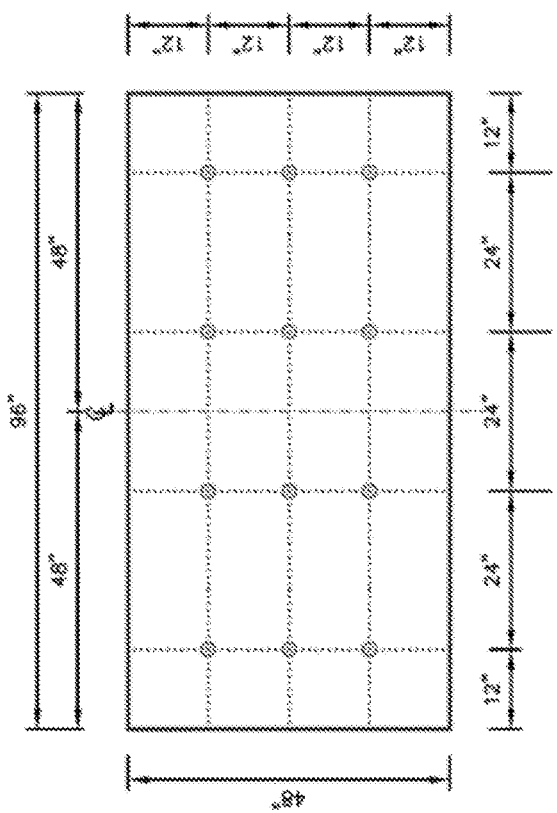
FIG. 3 illustrates a prior art fastener pattern on an insulation board, comprising twelve fasteners.
Figure 6:
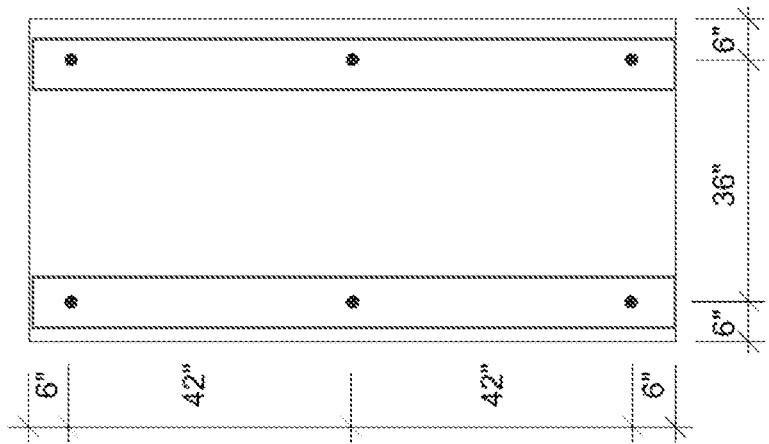
FIG. 6 illustrates an exemplary 4-inch reinforcement tape pattern on a surface of a non-woven facer.

Additionally, conventional lower density polymer insulation boards are not formed with even a single reinforced non-woven facer. Such conventional insulation boards require at least 12 metal fasteners per 4'×8' board (FIG. 3). However, it has been discovered that adhering a reinforced facer to at least one of the top and bottom surfaces of the lower-density polymer foam core in the manufacture of insulation board reduces the number of metal fasteners from 12 fasteners to 8 fasteners or less. See FIG. 4.

In some exemplary embodiments, the construction boards are formed by adhering two facers to a single side of the construction board core (i.e. a first coated facer adhered to either the top surface of the core or the bottom side of the core and a second reinforced facer adhered to the first coated facer). In some exemplary embodiments, the first and/or second coated facers may comprise reinforced facers. The second coated facer may be adhered to the first coated facer by conventional means, such as the use of an adhesive, lamination, coating, and the like.

EXAMPLES

Example 1

Figure 9:
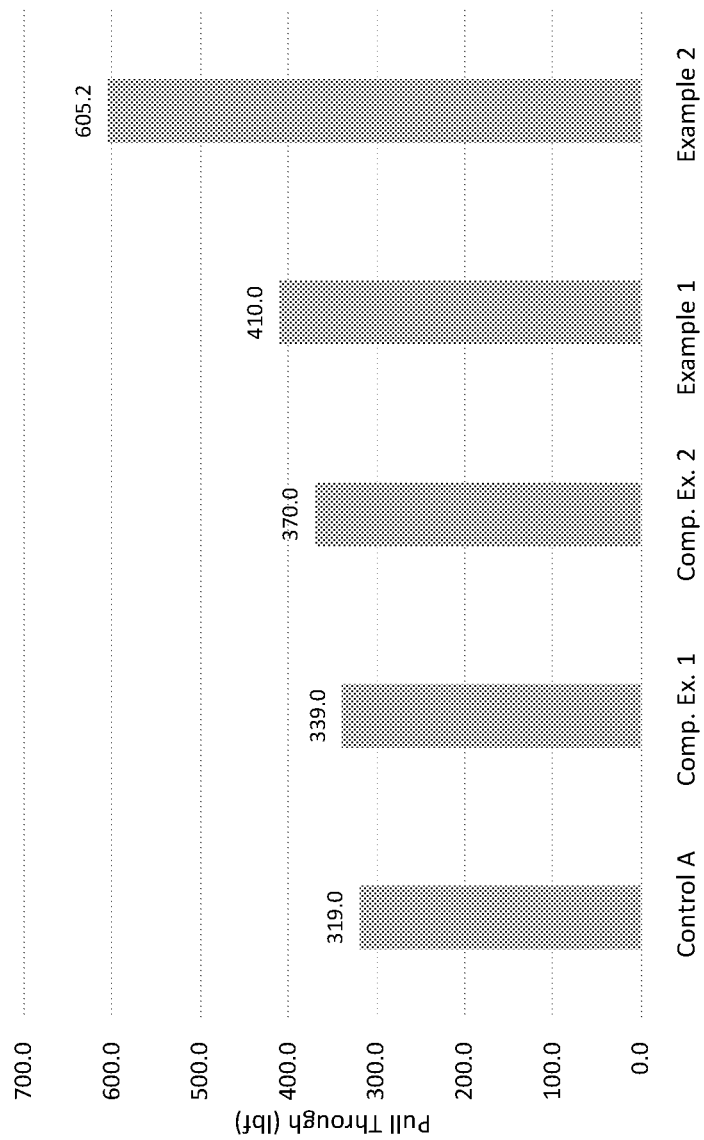
FIG. 9 graphically illustrates comparative fastener pull-through strength for conventional fiberglass mat-faced 2.0-inch insulation boards with that of the inventive reinforced 2.0-inch insulation boards.

Trials were conducted to compare the fastener pull-through strength for conventional fiberglass mat-faced 2-inch insulation boards with that of the inventive reinforced 2-inch insulation boards and the results are illustrated in FIG. 9. The samples were tested in accordance with modified ASTM D1761, Standard Test Methods for Mechanical Fasteners in Wood. Control A comprises a 2" thick standard density foam insulation board. Additionally, Comparative Examples 1 and 2 each comprise 2" thick insulation boards faced with only a single reinforced facer. Specifically, Comparative Example 1 comprises a reinforced nonwoven facer on the deck side of the insulation core. Comparative Example 2 comprises a reinforced nonwoven facer on the fastener side of the insulation core. As illustrated in FIG. 9, Control A demonstrates a fastener pull-through strength of 319 lbf. Similarly, Comparative Examples 1 and 2 demonstrate only slight improvements in fastener pull-through strength, ranging from 339.0 lbf to 370 lbf. In contrast, Example 1 includes a dual reinforced facer, where a 2" thick insulation core is faced with a double stack of reinforced nonwoven facers on a single surface of the core and this configuration demonstrates a fastener pull-through strength of 410.0 lbf. Example 2, which includes a 2" thick insulation core, faced on both surfaces with a reinforced nonwoven facer, in accordance with the present invention, demonstrates a fastener pull-through strength of 605.2 lbf. Thus, the subject reinforced faced insulation boards demonstrate a surprisingly improved fastener pull-through peak load of upwards of 400 lbf, including greater than 500 lbf, and greater than 600 lbf.

Example 2

Figure 10:
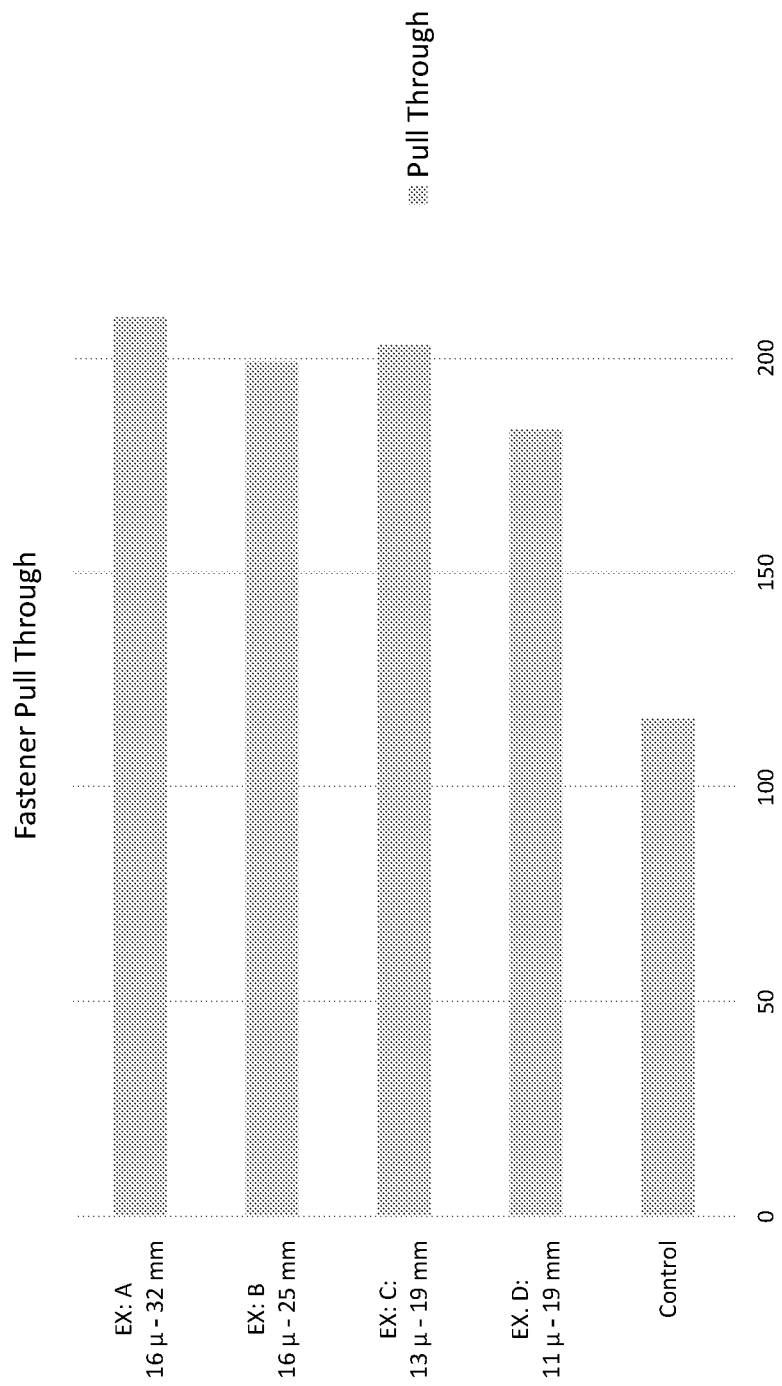
FIG. 10 graphically illustrates comparative fastener pull-through strengths for various coated fiberglass facers adhered to one major surface of a 0.5-inch-thick polyisocyanurate board.

Trials were conducted to compare the fastener pull-through strengths for various fiberglass facers. A single facer was adhered to one major surface of a polyisocyanurate cover board, with a thickness of 0.5 inches. The samples were tested in accordance with modified ASTM D1761, Standard Test Methods for Mechanical Fasteners in Wood, and the results are illustrated in FIG. 10. The Control includes a precursor mat with a basis weight of 75 g/m2 that is coated with 245 g/m2 coating applied to a surface of the mat. The Control does not include an impregnated coating. Each of Examples A-D comprises a precursor mat with a 120 g/m2 basis weight that is impregnated with a vinyl acetate ethylene coating composition. Examples A-D differ by precursor fiber size. Example A comprises a precursor mat having an average of 16-micron diameter glass fibers with an average length of 32 mm. Example B comprises a precursor mat having an average of 16 micron diameter glass fibers with an average length of 25 mm. Example C comprises a precursor mat having an average of 13 micron diameter glass fibers with an average length of 19 mm. Example D comprises a precursor mat having an average of 11 micron diameter glass fibers with an average length of 19 mm. Additionally, for each Example, including the Control, the precursor fiberglass mats comprise a urea formaldehyde/acrylic based binder composition.

As illustrated in FIG. 10, each of Examples A-D provide an improved fastener pull-through strength, of at least 180 lbf compared to the Control, with a fastener pull-through strength of 116 lbf. Examples A-C illustrate fastener pull-through strengths of at least 199 lbf, with Example A demonstrating the highest fastener pull-through strength at 209 lbf.

Example 3

Figure 11:
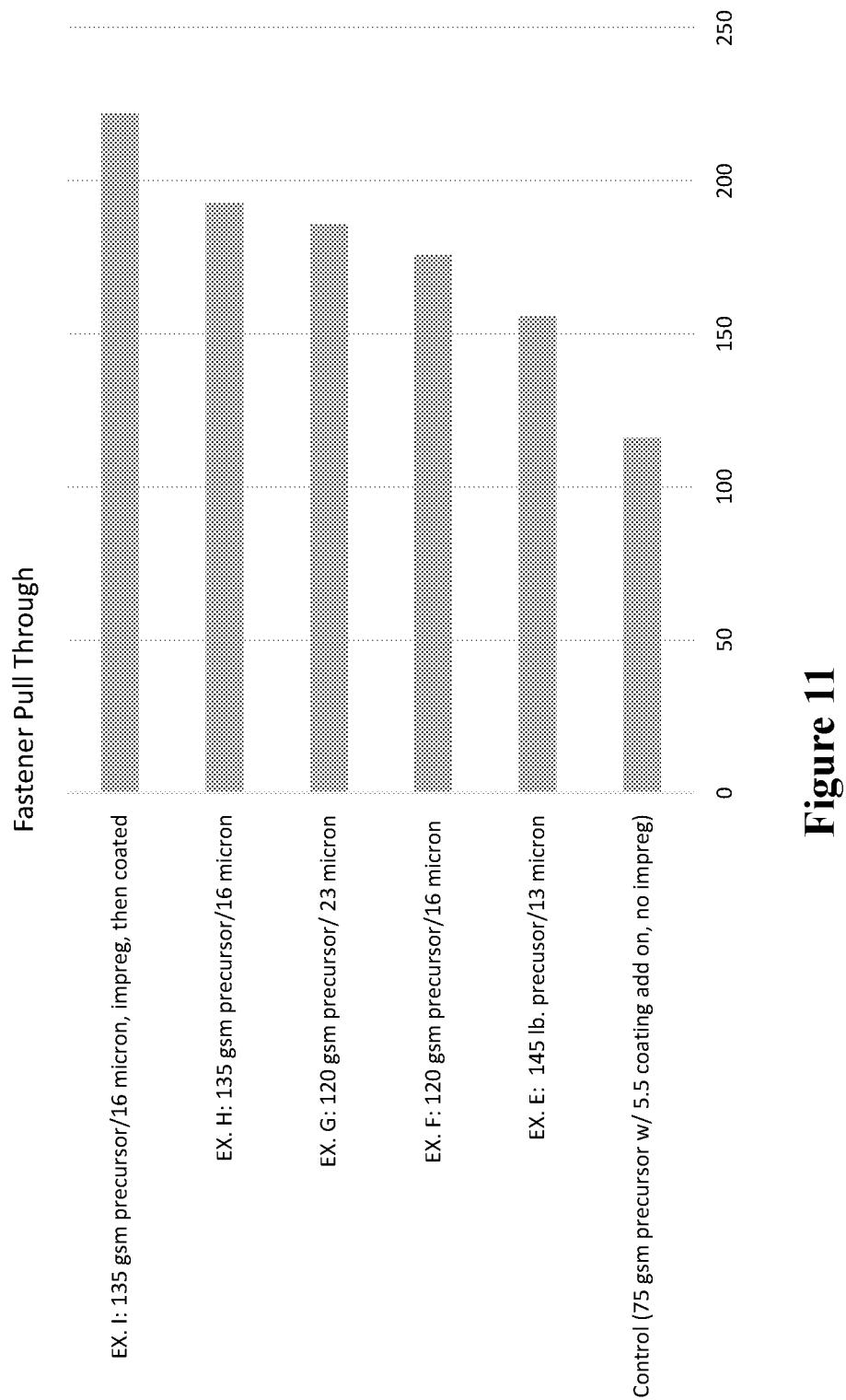
FIG. 11 graphically illustrates comparative fastener pull-through strengths for various coated fiberglass facers adhered to one major surface of a 0.5-inch-thick polyisocyanurate board.

Trials were conducted to compare the fastener pull-through strengths for various coated fiberglass facers. A single facer was adhered to one major surface of a polyisocyanurate coverboard, with a thickness of 0.5 inches. The samples were tested in accordance with modified ASTM D1761, Standard Test Methods for Mechanical Fasteners in Wood, and the results are illustrated in FIG. 11. The Control comprises a precursor mat with a basis weight of 75 g/m2 that is coated with 245 g/m2 of coating applied to a surface of the precursor mat. The Control does not include an impregnated coating. Example E includes a 145 g/m2 precursor mat comprising an average of 13-micron diameter glass fibers and coated with 290 g/m2 of coating composition. Example F includes a 120 g/m2 precursor mat comprising an average of 16-micron diameter glass fibers and coated with 290 g/m2 of coating composition. Example G includes a 120 g/m2 precursor mat comprising an average of 23-micron diameter glass fibers and coated with 6 lbs. of coating composition. Example H includes a 135 g/m2 precursor mat comprising an average of 16-micron diameter glass fibers and coated with 290 g/m2 of coating composition. Example I includes a 135 g/m2 precursor mat comprising an average of 16-micron diameter glass fibers and impregnated with a vinyl acetate ethylene first coating composition and then coated with 290 g/m2 of coating composition. The impregnated and coated mat of Example I had a LOI of 40% and a basis weight of 490 g/m2. For each of Examples E-I, the coating compositions include an acrylic resin and calcium carbonate filler. Additionally, for each Example, including the Control, the precursor fiberglass mats were formed using a urea formaldehyde/acrylic based binder composition.

As illustrated in FIG. 11, the Control demonstrates a fastener pull-through strength of 116 lbf. In contrast, Examples E-I demonstrate fastener pull-through strengths of above 150 lbf and Example I demonstrated a fastener pull-through strength of 222 lbf.

Example 4

Figure 12:
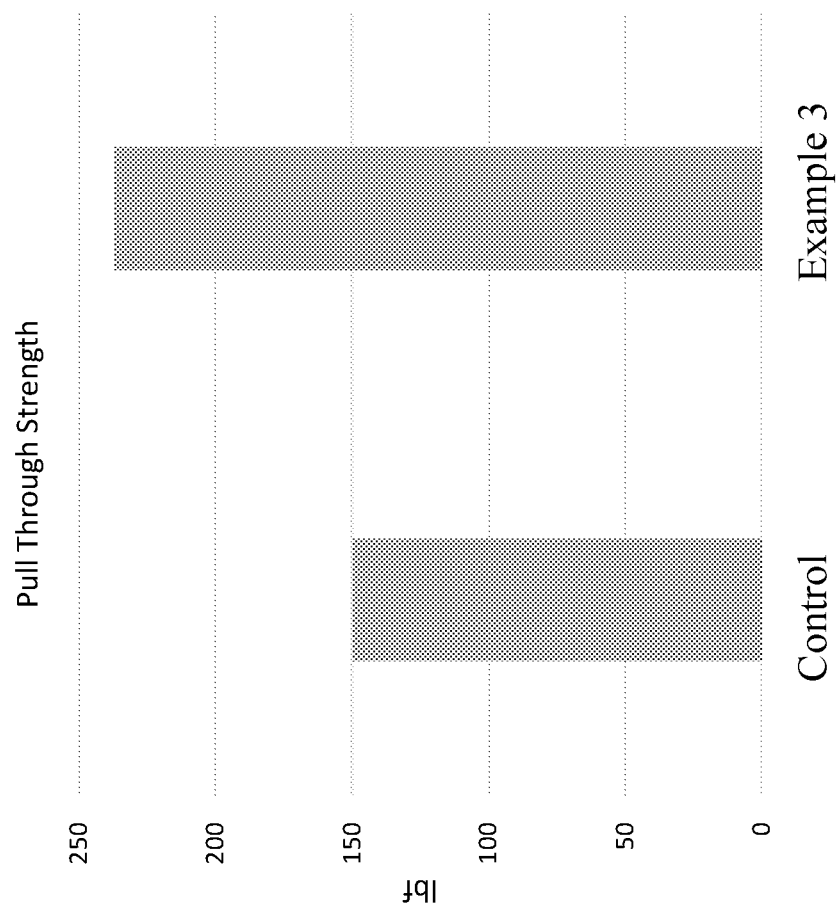
FIG. 12 graphically illustrates the comparative fastener pull-through strength for a conventional fiberglass mat-faced 2.0-inch insulation board with that of an inventive reinforced 2.0-inch insulation boards.

Trials were conducted to compare the fastener pull-through strength for conventional fiberglass mat-faced 0.5 inch thick coverboards with that of inventive dual-reinforced 0.5 inch thick coverboards comprising a layer of insulation glass adhered to a nonwoven facer. The samples were tested in accordance with the modified ASTM D1761 method. The results are illustrated in FIG. 12. The Control comprises a 0.5 inch thick standard density foam coverboard faced comprising only a single conventional fiberglass facer. Example 3 comprises an insulation glass-reinforced nonwoven facer adhered to a single side of the foam core. The insulation glass comprises fiberglass having an average diameter between 3 and 6 microns and an average length between 0.25 and 1.5" length. The amount of insulation glass applied to the nonwoven facer was about 100 to 125 g/m$^2$. As illustrated in FIG. 12, the Control demonstrates a fastener pull-through strength of 150 lbf. In contrast, Example 3, including a dual-reinforced facer, where a 0.5 inch thick foam core is faced with a nonwoven facer reinforced with a layer of insulation glass applied to a single surface of the core, and this configuration demonstrates an improved fastener pull-through strength of about 240 lbf. Thus, the insulation glass reinforcement increases the fastener pull-through strength by about 90 lbf.

Example 5

Figure 13:
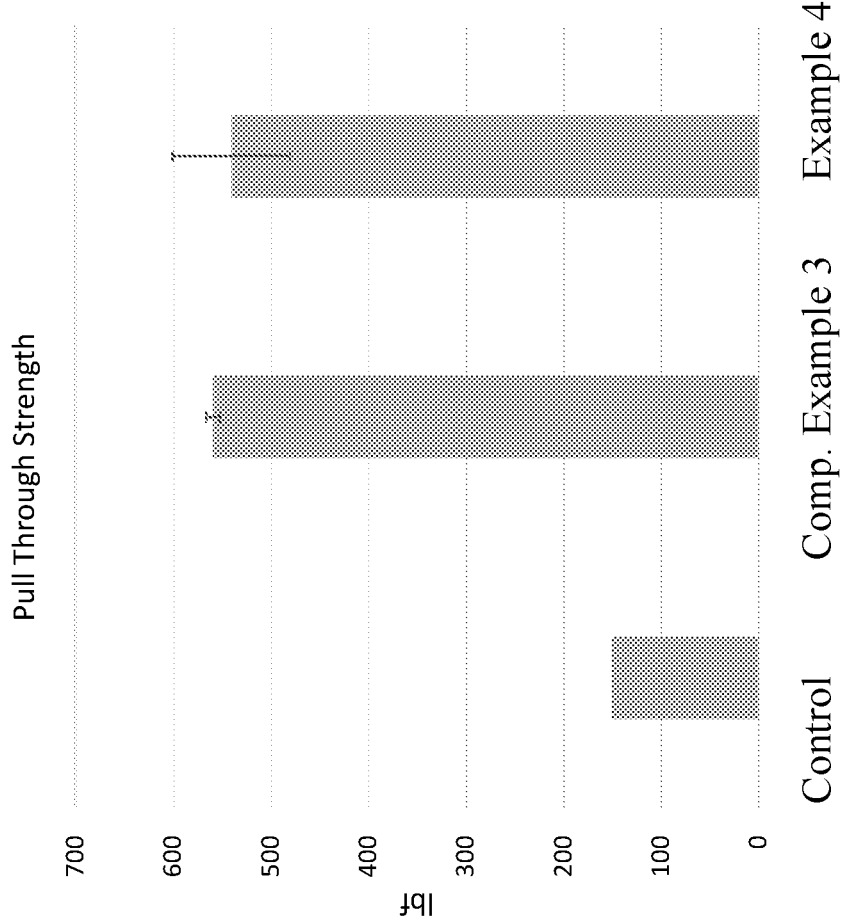
FIG. 13 graphically illustrates the comparative fastener pull-through strength for a fiberglass facer reinforced with a layer of insulation glass and adhered to a major surface of a 0.5-inch-thick polyisocyanurate board and a conventional fiberglass mat-faced 0.5-inch thick polyisocyanurate board.

Trials were conducted to compare the fastener pull-through strength for conventional fiberglass mat-faced 2-inch insulation boards with that of a reinforced 2-inch insulation board comprising a scrim adhered to the nonwoven facer using a coating composition. The samples were tested in accordance with a modified ASTM D1761 method. The results are illustrated in FIG. 13. The Control comprises a 2" thick standard density foam insulation board faced with only a single conventional fiberglass facer. Comparative Example 3 comprises a scrim-reinforced nonwoven facer adhered to a single side of an insulation core. The scrim is adhered to the nonwoven facer with an adhesive, which is applied in a separate lamination process. The scrim is sandwiched between the nonwoven facer and the foam core. In contrast, the sample of Example 4 comprises a coating-adhered scrim, whereby the scrim is adhered to a top surface of the nonwoven facer by the coating composition applied to the nonwoven facer. Thus, the nonwoven facer is sandwiched between the scrim and the foam core. The sample of Example 4 is produced in a single, continuous process, as opposed to a multi-step process. As illustrated in FIG. 13, the Control demonstrates a fastener pull-through strength of 150 lbf. In contrast, Comparative Example 3 demonstrates a fastener pull-through strength of about 550 lbf and Example 4 demonstrates a fastener pull-through strength of about 540 lbf, which is statistically equivalent in performance to the sample of Comparative Example 3.

Examples 6 and 7

Figure 14:
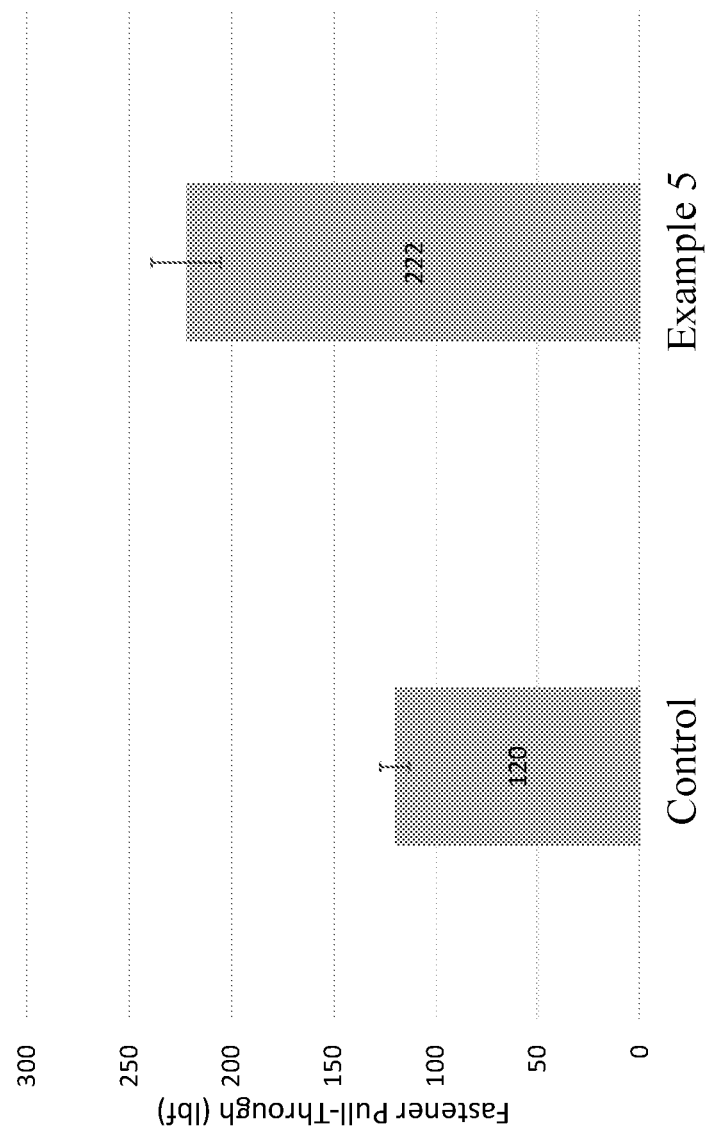
FIG. 14 graphically illustrates the comparative fastener pull-through strength for a conventional fiberglass mat-faced 2.0-inch insulation board with that of an inventive reinforced 2.0-inch insulation boards.
Figure 15:
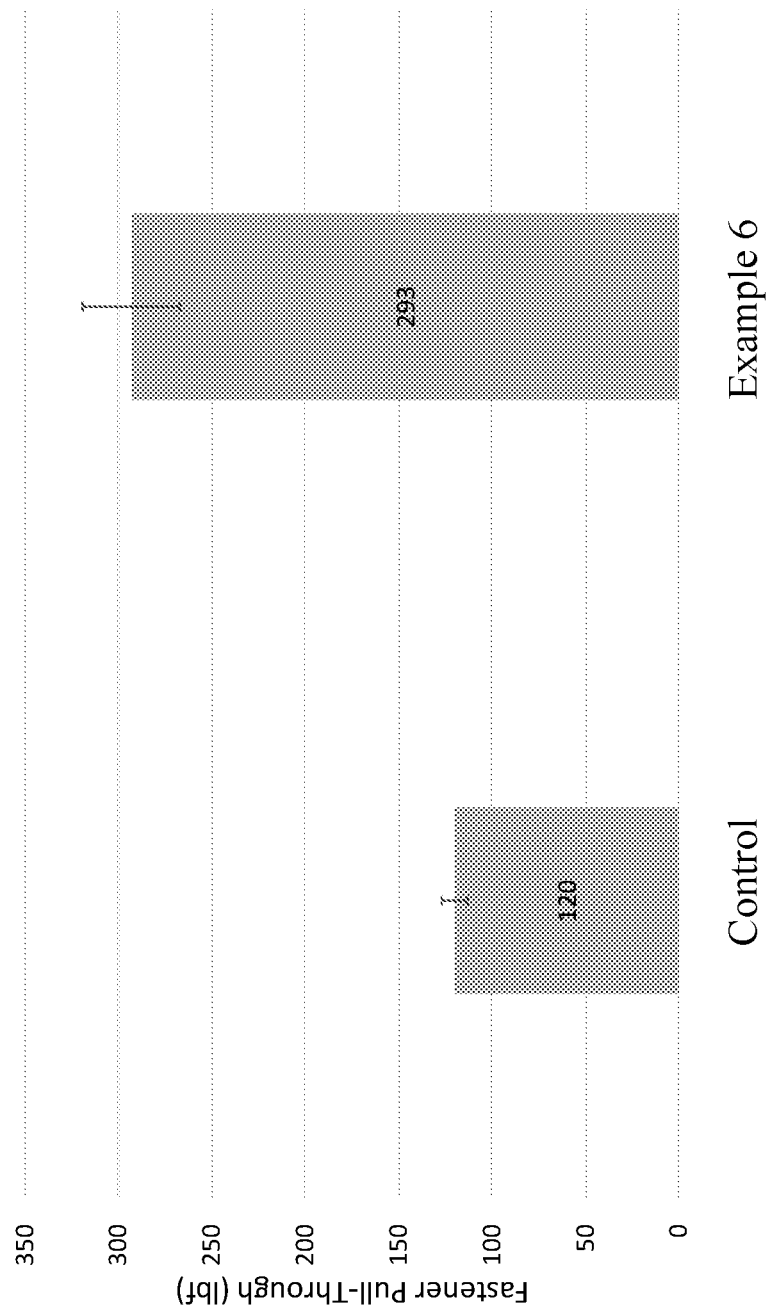
FIG. 15 graphically illustrates the comparative fastener pull-through strength for a conventional fiberglass mat-faced 2.0-inch insulation board with that of an inventive reinforced 2.0-inch insulation boards.

Trials were conducted to compare the fastener pull-through strength for conventional fiberglass mat-faced 0.5 inch thick coverboards with that of inventive reinforced 0.5 inch thick coverboards comprising a nonwoven facer including an impregnation coating, followed by a second coating. The samples were tested in accordance with a modified ASTM D1761 method. The results are illustrated in FIGS. 14 and 15. The Control in each of FIGS. 14 and 15 comprises a 0.5 inch thick standard density foam coverboard faced with only a single conventional coated fiberglass facer. Example 5 comprises a 0.5 inch thick standard density foam coverboard faced with a nonwoven facer comprising a 130 g/m² fiberglass precursor formed with glass fibers with an average diameter of 16 microns and a conventional urea formaldehyde/acrylic binder composition. The precursor mat is impregnated with a vinyl acetate ethylene first composition (about 15 g/m² loading) and then coated with a second composition comprising about 92% filler, 7% binder, and 1% additives. The dual-coated nonwoven facer has a total weight of 490 g/m². Example 6 comprises a 0.5 inch thick standard density foam coverboard faced with a non-woven facer comprising a 190 g/m² fiberglass precursor comprising glass fibers with an average diameter of 13 microns and formed with a conventional polyvinyl alcohol binder composition. The precursor mat is impregnated with a styrene butadiene first composition (about 100 g/m² loading) and then coated with about 200 g/m² of a second composition comprising about 92% filler, 7% binder, and 1% additives.

As illustrated in FIGS. 14 and 15, the Control demonstrates a fastener pull-through strength of 120 lbf. In contrast, Example 5 demonstrates a fastener pull-through strength of 222 lbf and Example 6 demonstrates a fastener pull-through strength of 293 lbf.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The composite non-woven mats of the present disclosure can comprise, consist of, or consist essentially of the essential elements and limitations of the disclosure as described herein, as well as any additional or optional components or limitations described herein or otherwise useful in nonwoven mat applications.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices, systems, and methods disclosed. It is sought, therefore, to cover all such changes and modifications as fall within the spirit and scope of the general inventive concepts, as described and/or claimed herein, and any equivalents thereof.

What is claimed is:

1. A dual-reinforced insulation board comprising:
   a core having an upper surface and an opposing lower surface, defining a thickness therebetween of from 1.0 to 5.0 inches;
   a first reinforced fibrous facer adhered to the upper surface of the core, said first reinforced fibrous facer comprising:
      a non-woven mat comprising a plurality of fibers bound by a binder composition, the non-woven mat being impregnated by a first coating composition that is free of filler and coated on a first surface with a second coating composition; and
      a reinforcement layer adhered to at least a portion of the first surface of the non-woven mat; and
   a second fibrous facer adhered to the lower surface of the core, said second fibrous facer comprising:
      a non-woven mat coated on a first surface with a coating composition; and
      optionally, a reinforcement layer adhered to at least a portion of the first surface of the non-woven mat;
   wherein the dual-reinforced insulation board has a fastener pull-through strength of at least 400 lbf.

2. The dual-reinforced insulation board of claim 1, wherein the non-woven mats of at least one of the first reinforced fibrous facer and second fibrous facer comprise glass fibers.

3. The dual-reinforced insulation board of claim 1, wherein the second coating composition of the first reinforced fibrous facer and the coating composition of the second fibrous facer comprise a polymeric binder component and a filler component.

4. The dual-reinforced insulation board of claim 1, wherein the reinforcement layer on the first fibrous non-woven facer or the second fibrous non-woven facer comprises a scrim, a secondary coating, a secondary non-woven mat, a reinforcement tape, or a layer of insulation glass.

5. The dual-reinforced insulation board of claim 4, wherein the scrim comprises glass fibers, synthetic fibers, or a combination thereof.

6. The dual-reinforced insulation board of claim 1, wherein the core of the dual-reinforced insulation board comprises a polymer foam having a density of less than 3.0 lbs./ft³.

7. The dual-reinforced insulation board of claim 1, wherein at least one of the first reinforced fibrous facer and second fibrous facer has a tensile strength of at least 250 lbf.

8. A dual-reinforced coverboard comprising:
   a core having an upper surface and an opposing lower surface, defining a thickness therebetween of from 0.2 to 3.0 inches and having a density of greater than 3.0 lbs./ft³;
   a first reinforced fibrous facer adhered to the upper surface of the core, said first reinforced fibrous facer comprising:
      a non-woven mat comprising a plurality of fibers bound by a binder composition, the non-woven mat being impregnated by a first coating composition that is free of filler and coated on a first surface with a second coating composition; and
      a reinforcement layer adhered to at least a portion of the first surface of the non-woven mat; and
   a second fibrous facer adhered to the lower surface of the core, said second reinforced fibrous facer comprising:
      a non-woven mat coated on a first surface with a coating composition; and optionally, a reinforcement layer adhered to at least a portion of the first surface of the non-woven mat;
wherein the dual-reinforced coverboard has a fastener pull-through strength of at least 150 lbf.

9. The dual-reinforced coverboard of claim 8, wherein the non-woven mats of at least one of the first reinforced fibrous facer and second fibrous facer comprises glass fibers.

10. The dual-reinforced coverboard of claim 8, wherein at least one of the second coating composition of the first reinforced fibrous facer and the coating composition of the second fibrous facer comprises a polymeric binder component and a filler component.

11. The dual reinforced coverboard of claim 8, wherein the reinforcement layer of at least one of the first fibrous non-woven facer and the second fibrous non-woven facer comprises a scrim, a second non-woven mat, a reinforcement tape, or a layer of insulation glass.

12. The dual-reinforced coverboard of claim 11, wherein the scrim comprises glass fibers, synthetic fibers, or a combination thereof.

13. The dual-reinforced coverboard of claim 8, wherein at least one of the first reinforced fibrous facer and second fibrous facer has a tensile strength of at least 250 lbf.

14. A dual-reinforced coverboard comprising:
a core having an upper surface and an opposing lower surface, defining a thickness therebetween of from 0.2 to 3.0 inches;
a first fibrous facer adhered to the upper surface of the core, said first reinforced fibrous facer comprising:
a non-woven mat comprising a plurality of nonwoven glass fibers bound by a thermoset binder composition, wherein the non-woven mat is impregnated with a first coating composition and further includes a second coating composition applied on a first surface of the non-woven mat, and
wherein the dual-reinforced coverboard has a fastener pull-through strength of at least 150 lbf,
wherein the first coating composition is free of filler;
wherein the second coating composition comprises from about 2% to about 20% of a polymeric binder and from 65 wt. % to 98 wt. % filler, based on the total weight of the second coating composition.

15. A dual-reinforced insulation board comprising:
a core having an upper surface and an opposing lower surface, defining a thickness therebetween of from 1.0 to 5.0 inches;
a fibrous facer adhered to the upper surface of the core, said fibrous facer comprising:
a coated non-woven mat comprising a plurality of nonwoven glass fibers bound by a thermoset binder composition, wherein the non-woven mat is impregnated with a first coating composition and further includes a second coating composition applied on a first surface of the non-woven mat, and
wherein the dual-reinforced insulation board has a fastener pull-through strength of at least 400 lbf,
wherein the first coating composition is free of filler,
wherein the second coating composition comprises from about 2% to about 20% of a polymeric binder and from 65 wt. % to 98 wt. % filler, based on the total weight of the second coating composition.

16. The dual-reinforced coverboard of claim 15, wherein the first coating composition is applied to the non-woven mat in an amount from 15 $g/m^2$ to 50 $g/m^2$.

17. The dual-reinforced coverboard of claim 15, wherein the second coating composition is applied to the non-woven mat in an amount from 10 $g/m^2$ to 200 $g/m^2$.

18. The dual-reinforced coverboard of claim 15, wherein the coated non-woven mat has an LOI in the range of from 20% to 45%.

19. The dual-reinforced coverboard of claim 15, wherein the coated non-woven mat has a basis weight of from 200 $g/m^2$ to 525 $g/m^2$.

\* \* \* \* \*